US012451317B2

(12) United States Patent
Wimmer et al.

(10) Patent No.: US 12,451,317 B2
(45) Date of Patent: Oct. 21, 2025

(54) REDUCING AN ELECTRON EMISSION OF AN ELECTRON EMITTER

(71) Applicant: Siemens Healthineers AG, Forchheim (DE)

(72) Inventors: Michael Wimmer, Weisendorf (DE); Joerg Freudenberger, Kalchreuth (DE); Anja Fritzler, Erlangen (DE); Christoph Jud, Nuremberg (DE); Peter Geithner, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 0 days.

(21) Appl. No.: 19/041,182

(22) Filed: Jan. 30, 2025

(65) Prior Publication Data

US 2025/0246393 A1 Jul. 31, 2025

(30) Foreign Application Priority Data

Jan. 31, 2024 (DE) ..................... 10 2024 200 886.9

(51) Int. Cl.
*H01J 35/14* (2006.01)
*H01J 35/04* (2006.01)
*H01J 35/06* (2006.01)

(52) U.S. Cl.
CPC .......... *H01J 35/045* (2013.01); *H01J 35/064* (2019.05)

(58) Field of Classification Search
None
See application file for complete search history.

(56) References Cited

U.S. PATENT DOCUMENTS

| | | | | |
|---|---|---|---|---|
| 5,075,595 | A | 12/1991 | Kane | |
| 9,748,071 | B2 | 8/2017 | Guerrera et al. | |
| 10,741,353 | B2 | 8/2020 | Kenmotsu et al. | |
| 2007/0252528 | A1* | 11/2007 | Vermuelen | H01Q 1/405 315/34 |
| 2008/0067912 | A1* | 3/2008 | Ishida | H01J 9/025 445/51 |
| 2008/0069420 | A1* | 3/2008 | Zhang | H05G 1/52 382/132 |
| 2010/0226479 | A1 | 9/2010 | Beyerlein et al. | |

(Continued)

FOREIGN PATENT DOCUMENTS

| | | | |
|---|---|---|---|
| DE | 102009011642 | A1 | 9/2010 |
| EP | 3933881 | A1 | 1/2022 |

(Continued)

OTHER PUBLICATIONS

German Office Action and English translation thereof for German Application No. 10 2024 200 886.9 mailed Sep. 25, 2024.

(Continued)

*Primary Examiner* — Hoon K Song
(74) *Attorney, Agent, or Firm* — Harness, Dickey & Pierce, P.L.C.

(57) ABSTRACT

A method for reducing electron emission of an electron emitter comprises: emitting electrons from a first current path via at least one first field effect emitter element, subject to an emission voltage between a gate electrode and an emission surface; determining a property of the first current path; and activating a first current limiting unit subject to the properties of the first current path to reduce the electron emission of the electron emitter.

17 Claims, 3 Drawing Sheets

(56) References Cited

U.S. PATENT DOCUMENTS

| | | | | |
|---|---|---|---|---|
| 2011/0038460 | A1* | 2/2011 | Grasruck .............. | H01J 35/147<br>378/138 |
| 2021/0410258 | A1 | 12/2021 | Jafari et al. | |

FOREIGN PATENT DOCUMENTS

| | | | |
|---|---|---|---|
| EP | 3075000 | B1 | 8/2024 |
| WO | WO 2013136299 | A1 | 9/2013 |

OTHER PUBLICATIONS

German Decision to Grant and English translation thereof for German Application No. 10 2024 200 886 mailed Apr. 3, 2025.

Asadi R.F. et al.:“Failure Mode of Si Field Emission Arrays based on Emission Pattern Analysis,” 2021 34th International Vacuum Nanoelectronics Conference (IVNC), Lyon, France, 2021, pp. 1-2.

* cited by examiner

REDUCING AN ELECTRON EMISSION OF AN ELECTRON EMITTER

CROSS-REFERENCE TO RELATED APPLICATION(S)

The present application claims priority under 35 U.S.C. § 119 to German Patent Application No. 10 2024 200 886.9, filed Jan. 31, 2024, the entire contents of which is incorporated herein by reference.

FIELD

One or more embodiments of the present invention relate to a method for reducing an electron emission of an electron emitter, an associated computer program product, the electron emitter, and an X-ray source.

BACKGROUND

X-ray sources typically generate X-rays via electrons, which are produced by an electron emitter in a vacuum and, after being accelerated via a high voltage, are decelerated when they interact with an anode. The electron emitters regularly used for this purpose can be divided in particular into so-called thermionic electron emitters and cold electron emitters. Thermionic electron emitters produce electrons in particular according to the Edison-Richardson effect by heating the emitter elements. Cold electron emitters emit electrons in particular without comparable heating, but rather according to the field effect, for example, via field effect emitter elements set up for this purpose.

Conventional electron emitters with field effect emitter elements are known in particular from U.S. Pat. No. 9,748,071 B2 or EP 3 933 881 A1. The first describes in particular a layout of the field effect emitter elements comprising emitter needles with transistor structures, preferably to enable switching of independent groups of the field effect emitter elements. By contrast, the latter concerns protection devices used to prevent charged particles impacting the field effect emitter elements during operation of such electron emitters.

WO 2013 136 299 A1 relates to an imaging device, comprising an electron-receiving construct, an electron-emitting construct, and an inner opening to provide an unhindered space between the electron-emitting construct and electron-receiving construct. The imaging device also comprises a resistance layer that is arranged between the electron-emitting construct of the field emission type and the emitter seat.

In comparison to thermionic emitter elements, electron emitters with field effect emitter elements are regularly more prone to damage or even destruction by electrical discharge processes, especially high-voltage flashovers between the cathode device and the anode, within the X-ray source. Such high-voltage flashovers can, for example, cause a short circuit between the field effect emitter elements and the gate electrode of the electron emitter. See in relation to the associated effects, for example, R. F. Asadi, T. Zheng, J. Da Silva, G. Rughoobur, A. I. Akinwande, and B. Gnade, "Failure Mode of Si Field Emission Arrays based on Emission Pattern Analysis," 2021 34th International Vacuum Nanoelectronics Conference (IVNC), Lyon, France, 2021, pp. 1-2, doi: 10.1109/IVNC52431.2021.9600740.

SUMMARY

An object of embodiments of the present invention is to disclose a method for reducing an electron emission of an electron emitter, an associated computer program product, the electron emitter, and an X-ray source, which can be used to extend the operating life of the electron emitter.

At least this object is achieved by the features of the independent claims. Advantageous embodiments are described in the dependent claims.

Independent of the grammatical term usage, individuals with male, female or other gender identities are included within the term.

The method, according to an embodiment of the present invention, for reducing an electron emission of an electron emitter, wherein the electron emitter has

- a plurality of field effect emitter elements aligned in parallel to form an emission surface on the top of the plurality of field effect emitter elements aligned in parallel,
- a gate electrode, which is arranged above the emission surface, and
- a first current limiting unit,
- wherein the first current limiting unit and at least one first field effect emitter element of the plurality of field effect emitter elements are part of a first current path,
- wherein the at least one first field effect emitter element is arranged electrically between the first current limiting unit and the gate electrode in the first current path, comprising the steps:
- emission of electrons from the first current path via the at least one first field effect emitter element, subject to an emission voltage between the gate electrode and the emission surface,
- determination of the properties of the first current path,
- activation of the first current limiting unit subject to the determined properties of the first current path for reducing the electron emission of the electron emitter.

The electron emitter, according to an embodiment of the present invention, is set up to perform the method, according to an embodiment of the present invention, for reducing the electron emission.

The cathode device, according to an embodiment of the present invention, for an X-ray source has

- the electron emitter and
- an emitter seat.

The X-ray source, according to an embodiment of the present invention, has

- the cathode device,
- an anode, and
- an evacuated housing, wherein the cathode device and the anode are arranged within the evacuated housing.

The anode can in particular be a rotating anode or a standing anode. It is conceivable in principle for the anode to rotate with the evacuated housing.

The electrons generated by the cathode device are in particular accelerated from the cathode device towards the anode via an acceleration unit. The acceleration unit comprises in particular a high voltage source or a high frequency source. Subject to the type of acceleration unit, the X-ray source is typically an X-ray emitter, especially for imaging applications in the keV range, or a linear accelerator, especially for imaging or therapeutic applications in the MeV range.

The cathode device is in particular a cathode for the X-ray source. The electrical potential of the cathode is typically negative in comparison to the electrical potential of the anode.

The electron emitter is set up in particular to produce the electrons via the field effect emitter elements. The electron emitter is in particular a complete component, for example, an electron emitter chip. The electron emitter can, for example, consist of the plurality of field effect emitter elements aligned in parallel, the gate electrode, and the multiple first contact elements.

The term "plurality of field effect emitter elements" means in particular that so many field effect emitter elements are part of the emission surface that the emission surface has an electron current density of at least 0.1 A/cm^2, preferably at least 3 A/cm^2, but in particular advantageously at least 10 A/cm^2. The number of field effect emitter elements required for this is typically at least 1,000, regularly more than 1,000,000. The emission surface advantageously has dimensions of at least 0.1 to 0.1 cm^2 and/or a maximum of 10 to 10 cm^2.

The field effect emitter elements can be embedded in an insulating matrix. The insulating matrix preferably holds the plurality of field effect emitter elements together.

The field effect emitter elements are in particular aligned in parallel and/or flush in relation to the emission surface. In this instance, the emission surface is advantageously as level as possible. The emission surface can be post-processed in principle, in order to be as level as possible.

The field effect emitter elements typically have an emission point or an emission section at an end of each field effect emitter element. The emission surface consists in particular of the emission points or the emission sections of the field effect emitter elements. The emission point is, for example, the tip of a field effect emitter element embodied as a field effect emitter needle. The emission section comprises, for example, the emission point and an adjacent area around the emission point.

The emission surface is in particular the top of the plurality of field effect emitter elements. A top of the electron emitter can correspond to the top of the plurality of field effect emitter elements, in particular when disregarding the gate electrode and/or comprehensively integrating the gate electrode into the volume of the field effect emitter elements.

The sides of the plurality of field effect emitter elements define in particular the surfaces of the plurality of field effect emitter elements and are effectively synonymous in this description. The sides of the plurality of field effect emitter elements comprise in particular a top, a bottom and a lateral side. Accordingly, the surfaces of the plurality of field effect emitter elements comprise in particular a top surface, which typically corresponds to the emission surface, a bottom surface, and a lateral surface, which typically corresponds to the side surfaces.

The top and bottom side of the field effect emitter elements typically have the same dimensions and/or the same geometric form. The geometric form can be angular, especially square, preferably rectangular, or round.

The side surfaces of the plurality of field effect emitter elements aligned in parallel connect in particular the top and bottom side. The side surfaces of the plurality of field effect emitter elements aligned in parallel are formed in particular by the longitudinal sides of the outermost field effect emitter elements and/or by the matrix surrounding the outermost field effect emitter elements.

The side surfaces cover in particular the entire circumference of the field effect emitter elements, i.e., 360°. If the geometric form of the top side of the field effect emitter elements is round, a side surface is by definition a lateral surface covering a maximum 90° of the circumference. If the geometric form of the top side of the field effect emitter elements is angular, a side surface spans a lateral surface from one edge to an adjacent edge, wherein the edges connect in each case the respective corners of the top and bottom side.

It is conceivable that the field effect emitter elements are grown on a substrate. The substrate can be removed in principle once the field effect emitter elements have grown, for example, can be sanded off. The substrate is typically arranged on a bottom side of the field effect emitter elements.

The field effect emitter elements are embodied, for example, as field effect emitter needles, wherein their tips form the emission points and thus the emission surface. The field effect emitter needles are in particular nanotubes. Alternatively, it is conceivable for the field effect emitter elements to form at least one Spindt cathode.

It is regularly possible to integrate transistor structures, for example, into the field effect emitter needles, especially if the field effect emitter needles consist of a semiconductor such as silicon, carbon or molybdenum.

The field effect emitter elements are in particular switchable individually, in groups, or all together. Electron emitters that comprise field effect emitter elements switchable individually or in groups are typically so-called pixelated or segmented emitters. The segmented circuit of the field effect emitter elements and thus of the electron emitter can be effected via various first or second contact elements and/or a segmentation of the gate electrode.

Current paths are defined in the present application in such a way that all field effect emitter elements that can only be switched on or off together, form a distinct current-carrying current path. Depending on the wiring, the plurality of field effect emitter elements can thus comprise a plurality of current paths for the individual field effect emitter elements, some current paths for field effect emitter elements switchable in groups, or a single current path if all field effect emitter elements are only switchable together. A separately switchable current path, in other words one that can be switched on or off via a contact element, is typically a current-carrying current path independent of other current paths.

Typically, each current path is assigned to exactly one segment of the electron emitter. Such a segment of the electron emitter forms in particular one pixel.

The gate electrode can in particular be embodied as a grid. The gate electrode is in particular arranged in such a way above the emission surface as to cause electron emissions in the respective field effect emitter elements via the emission voltage between the gate electrode and the emission surface in accordance with the field effect. In this context, the term "above" includes that the gate electrode reaches as close as possible to the respective field effect emitter elements, for example, is arranged directly at the height of the ends of the field effect emitter elements forming the emission surface and/or surrounds these ends of the field effect emitter elements.

The gate electrode is advantageously arranged so as, for example, to minimize an electron emission in or on the gate electrode and/or thermal effects. Alternatively or additionally, the gate electrode is advantageously arranged in such a way as to maximize the electron emission in or on the anode and/or mechanical stability and/or robustness with regard to the high-voltage flashover, for example.

The emission voltage is applied in particular between the emission point or the emission section of the respective field effect elements and the gate electrode. The current path, from which the electrons for the electron emission come, is typically closed for the electron emission.

The potential of the gate electrode is regularly more positive than the potential of the field effect emitter elements. For example, the gate electrode can be at constant ground potential and the field effect emitter elements on the negative potential. Alternatively, the field effect emitter elements can be at constant ground potential.

It is conceivable that the gate electrode can provide different emission voltages to the emission surface, in particular if the gate electrode is embodied as a grid. In this instance, the gate electrode can in particular be segmented, so that the electron emitter is a segmented electron emitter. For example, the emission voltage between groups of field effect emitter elements can be varied via the segmented gate electrode, for example, by varying the electrical potential of the segments of the gate electrode.

The electron emitter can in particular have multiple first contact elements for at least two of the electron emitter's current paths carrying current independently of each other. The emitter seat can have multiple second contact elements, which can be connected at the end of the current paths to the multiple first contact elements. Advantageously, the multiple first contact elements are arranged on a side of the plurality of field effect emitter elements aligned in parallel that is turned away from the emission surface.

The multiple first contact elements and the multiple second contact elements are designed in particular to produce a secure electrical connection through mutual contacting. In particular, an electrical connection can be effected by a first contact element and a second contact element. This electrical connection typically closes the current path at this point in this respect. The multiple second contact elements are designed in particular in such a way as part of the emitter seat that they can be connected to the multiple first contact elements.

The contact elements can comprise contact points or contact surfaces. The contact points typically have a contact surface that is as small as possible but still electrically secure. It is conceivable for a first contact element to have a contact point and for a second contact element to have a contact surface, wherein the contact point of the first contact element and the contact surface of the second contact element can be connected to each other, or vice versa. A contact surface typically has larger dimensions than a contact point, so that these two contact elements have a certain amount of play relative to each other in a plane.

The field effect emitter elements can connect directly to the multiple first contact elements. The connection between the multiple first contact elements and the field effect emitter elements can be effected by the substrate throughout.

The field effect emitter elements are connected to a power source in particular via electrically connected contact elements. In this instance, a current path runs in particular from the power source via a second contact element, and a first contact element connected to it, to the field effect emitter element.

It is conceivable for a first contact element to be connected to one or more field effect emitter elements. A second contact element can be connected to one or more first contact elements. The number of first contact elements and second contact elements can be identical or can vary.

"Multiple" contact elements means in particular that the number of first contact elements or second contact elements is typically at least one order of magnitude less than that of field effect emitter needles. It is conceivable in principle that the number of first contact elements corresponds to the number of field effect emitter needles.

The number of first contact elements typically correlates to the number of current paths. The multiple first contact elements for the at least two current paths, of the electron emitter, carrying current independently of each other are connected with electrical conductivity in particular to the at least two current paths. The at least two current paths of the electron emitter can only comprise current paths of the field effect emitter elements, or other current paths in addition to the current paths of the field effect emitter elements, for example, an additional current path of the gate electrode, of the electron emitter.

Connectable means in particular electrically connectable, i.e., to produce an electrical connection. Electrically connectable means in particular electrically contactable. Electrically connected means in particular electrically contacted.

Depending on the embodiment of the cathode device, the connectable contact elements may already be electrically connected. Unconnected contact elements have in particular not closed an associated current path, but rather this is open. In principle the first contact elements and the second contact elements are equally connectable or mutually exchangeable.

The emitter seat typically has fixings, in order to fix and/or align the electron emitter on the emitter seat via the fixings. The emitter seat has in particular a carrier body to which the two contact elements are fixed. The carrier body and the two contact elements are usually electrically isolated. The two contact elements are in particular arranged on a side of the emitter seat facing the electron emitter, especially the carrier body.

The emitter seat, in particular the carrier body, can be designed as a focus head for the emitted electrons. The emitter seat, in particular the carrier body, can be metallic, especially also electrically conductive, for example, at a negative high voltage potential or ground potential. The emitter seat can be designed in such a way as to extend the current paths of the field effect emitter elements up to the power source, in order to facilitate a connection of the field effect emitter elements to the power source. For this purpose, the emitter seat can have, for example, at least one wire connecting a field effect emitter element to the power source.

The side turned away from the emission surface is in particular not the top surface or top side. The side turned away from the emission surface can in particular be the bottom side and/or a lateral side. In particular, the multiple second contact elements do not face the emission surface, but rather face the multiple first contact elements. If the multiple first contact elements face the multiple second contact elements, then the first contact elements and the second contact elements are typically connectable.

The first current limiting unit advantageously facilitates operation of the electron emitter despite a change in the properties and/or because of particular original properties. The method, according to embodiments of the present invention, advantageously takes into account the present properties of the first current path and/or of the electron emitter for the operation itself.

Embodiments of the present invention advantageously allow for operation of the electron emitter in particular to be continued and/or performed with a reduced electron emission. The reduced electron emission can advantageously be adjusted via the first current limiting unit. The reduced electron emission is in particular synonymous with a reduced electron current.

Embodiments of the present invention are particularly advantageous for a pixelated or segmented electron emitter. In particular, the first current limiting unit can, in the event of damage, switch off the pixel with the first current path in the manner of a predetermined breaking point, while the rest of the electron emitter can advantageously continue to emit electrons. It is possible in principle to burn out a pixel with a short circuit with the first current limiting unit in the manner of a self-healing function of the electron emitter.

The properties relate in particular to the technical composition of the first current path and/or the electron emitter. The properties of the first current path and/or the electron emitter can in particular change because of aging and/or operation and/or externally caused damage, regularly worsening. The properties can in principle remain unchanged for a certain period. The determined properties are in particular the present properties of the first current path and/or the electron emitter at the time of determination.

A technical characteristic of the first current path and/or the electron emitter depends in particular on the present and thus determined properties. The quality of the technical characteristic correlates in particular to the quality of the properties.

The technical characteristic is in particular the capacity of the first current path and/or the electron emitter to generate a specific and/or predefined electron current. Thus, the technical characteristic is in particular the level of functionality in terms of the electron current.

As the electron emitter comprises at least partially the first current path, the electron emitter is influenced by the properties of the first current path. The properties of the first current path do not typically influence the properties of another current path of the electron emitter, but regularly, at most, only a technical characteristic itself in the form of embodiments of the present invention.

Reducing the electron emission means in particular reducing the originally intended and/or theoretically possible electron current. For example, the technical composition of the first current path and/or the electron emitter can be designed by a manufacturer of the electron emitter in such a way as to generate a specific and/or predefined electron current. According to embodiments of the present invention, this specific and/or predefined electron current is reduced via the first current limiting unit.

Alternatively or additionally, reducing the electron emission can in particular mean reducing an electron current that is already realized when the electron emitter is operated. For example, the capacity of the electron emitter can be completely impaired due to only partial damage, for example. According to embodiments of the present invention, such impairment is addressed by the first current limiting unit in such a way that the functioning part of the electron emitter can still produce electrons.

Reducing the electron emission can relate to the first current path and/or also an additional current path or all other current paths of the electron emitter. The electron emission is reduced, for example, if a single current path produces fewer or no electrons. Advantageously, another current path can still generate electrons.

Reducing the electron emission can mean switching off the electron emission. In this instance, the first current path and all other current paths can be switched off, for example. Alternatively, only the first current path can be switched off, while at least one other current path emits electrons.

When determining the properties of the first current path, the entire technical composition or only part of the technical composition can be determined. For example, the visible part and/or the electrically measurable part of the technical composition can be determined.

A sensor unit and/or a measuring unit and/or a memory unit and/or a processing unit are used, for example, to determine the properties of the first current path and/or the electron emitter. In particular, the memory unit and/or the processing unit can be part of the sensor unit and/or the measuring unit.

The sensor unit can use a camera, for example, to determine the present visual properties of the first current path and/or the electron emitter and/or, for example, provide sensor signals for the memory unit and/or processing unit. The sensor signals comprise in particular a signal value describing the properties and/or the raw sensor data.

The present visual properties can in particular relate to a topology of the emission surface. The present visual properties of the first current path and/or of the electron emitter can depend, for example, on the condition of the emission surface. The condition of the emission surface is typically worse, the more irregularities the emission surface has. The irregularities can in particular be intensified by externally caused damage to the emission surface. Alternatively or additionally, the irregularities can arise due to the manufacturing process of the electron emitter, for example, in the form of field effect emitter elements that are not completely identical in form and/or flush aligned. In this instance, the topology already has irregularities caused by the manufacturer.

The measuring unit can determine the electrical properties of the first current path and/or the electron emitter and/or, for example, provide measurement signals for the memory unit and/or processing unit. The measurement signals comprise in particular a measured value describing the properties and/or the raw measurement data.

The electrical properties can in particular indicate the conductivity of the first current path and/or all other current paths of the electron emitter. The electrical conductivity can in particular be worsened by externally caused damage to the emission surface and/or by overloading. The electrical conductivity typically fails or at least reduces if there is a short circuit. The measuring unit can, for example, measure a short circuit current.

It is conceivable in principle that sensor signals and/or measurement signals are stored in the memory unit for recall, especially by the processing unit. It is conceivable that the processing unit determines the properties via the sensor signals and/or the measurement signals.

The processing unit can have program code sections in particular, which can determine the properties from the sensor signals via image algorithms. The image algorithms can comprise in particular filtering and/or segmentation and/or transformation. Moreover, the processing unit can have program code sections in particular, which can determine the properties from the measurement signals via data algorithms. The data algorithms can comprise in particular filtering and/or a comparison of threshold values. The program code sections can preferably process sensor signals, sensor values, raw sensor data, measurement signals, measured values, and/or raw measurement data.

Determining the properties can in particular include comparing the properties to reference properties, especially the sensor signals and/or measurement signals to reference signals. For example, the memory unit can have the reference properties and/or reference signals. The reference signals typically have comparative values, threshold values, and/or comparative images. The reference properties and/or the reference signals can in particular describe an idealized model of the electron emitter and/or a delivery state of the electron emitter and/or a previous state of the electron emitter, especially using the previously determined properties.

Determining the properties can include repeating the determination of properties, especially if there has been little or no change to the properties compared to the previous determination results, preferably without activating the first current limiting unit. Alternatively or additionally, the determination of properties can include a generalized grading of the technical characteristic, for example, solely due to advanced aging and/or operating time. The generalized grading can be a reduction in the technical characteristic by a defined percentage.

When determining the properties, a control signal can be calculated, which describes the comparative result and/or the generalized grading. The control signal can advantageously be transmitted to the first current limiting unit.

Activation of the first current limiting unit means that the first current limiting unit is activated for the purpose of reducing the electron emission, especially in accordance with the control signal. Depending on the embodiment of the present invention, the activation can include switching on the first current limiting unit or switching off the first current limiting unit. Thus, activation means in particular an alteration of the operating state of the first current limiting unit to the effect that the electron emission is reduced after activation. Therefore, at least the potential and/or already realized electron current is typically higher before the activation of the first current limiting unit than the electron current generated after activation.

Activation of the first current limiting unit is effected in particular subject to a comparison of the determined properties and the reference properties and/or based on the generalized grading. The first current limiting unit is activated in particular on the basis of the control signal. The control signal can alternatively specify that the first current limiting unit is not activated.

The first current limiting unit can be activated multiple times, which can result in particular in a consecutive reduction in the electron emission. Multiple activation causes in particular a steady reduction in the electron emission.

An embodiment variant provides for the properties to be determined before the electron emission. The properties are preferably determined before a first electron emission, in particular after the production of the electron emitter. Activation of the first current limiting unit is also advantageously effected before the electron emission. This embodiment variant is particularly advantageous for preventing damage to the first current path during the (first) electron emission. It is also conceivable in principle that this embodiment variant is performed once an earlier electron emission has already been effected. In this instance, the electron emission is re-performed with this embodiment variant once the properties have been determined.

An advantageous development of the previous embodiment variant provides for the determination of properties to include a determination of the geometric form of the at least one first field effect emitter element in relation to the emission surface and for an assignment of the electrical potential to the geometric form. The geometric form can in particular be a relative height of a tip of the first field effect emitter element in relation to the emission surface. Alternatively or additionally, the geometric form can be a radius of the tip of the first field effect emitter element. The radius of the tip correlates in particular to the sharpness of the tip. The sharper the tip, the smaller the radius of the tip. The geometric form can be determined, for example, via the sensor unit, especially visually, and/or via the measuring unit, especially by comparison with other measured values. The assigned electrical potential depends in particular on the geometric form. For example, electrical potential values can be stored in the memory unit, which are assigned or can be assigned to different geometric forms. The assignment is effected via the processing unit, for example. The electrical potential can be zero, in particular if the geometric form does not differ, in particular is the same, in relation to the emission surface, namely to other field effect emitter elements; for example, the relative height and/or a difference between the radius and the average radius is zero. The average radius can, for example, depend on the geometric form of the other field effect emitter elements. The level of the electrical potential is typically higher, the greater the difference between the first field effect emitter element and the geometric form of the other field effect emitter elements. Determining the geometric form of the first field effect emitter element can in particular include a determination of the geometric forms of the first field effect emitter element and at least one other field effect emitter element adjacent to the first field effect emitter element. In this instance, the geometric form of the first field effect emitter element is, for example, a mean value of the first and the at least one adjacent field effect emitter element.

An advantageous development of the previous embodiment variant provides for activation of the first current limiting unit to include applying the assigned electrical potential to a first potential-regulating electrode of the first current limiting unit, in order to reduce the emission voltage in relation to the at least one first field effect emitter element. The first potential-regulating electrode is in particular part of the first current limiting unit. The emission voltage is typically lower, the more positive the assigned electrical potential is in comparison to the original, standard reference value for the electrical potential. The assigned electrical potential can regularly be electrically negative or positive overall. Because the at least one first field effect emitter element is arranged electrically between the first current limiting unit and the gate electrode in the first current path, the increase in the assigned electrical potential reduces the emission voltage and thus the electron emission in the current path at the point of the first current limiting unit.

An advantageous development of the previous embodiment variant provides for the assigned electrical potential to correspond to the gate potential for zeroing the emission voltage. In this instance, the emission voltage is advantageously zero and thus the electron emission from this at least one first field effect emitter element is switched off.

An advantageous development of the previous embodiment variants provides, after activation of the first current limiting unit, for electrons to be emitted from a second current path, subject to the emission voltage between the gate electrode and the emission surface, via the second field effect emitter element, wherein a second field effect emitter element is part of the second current path. In this instance, the emission voltage for the first field effect emitter element and the emission voltage for the second field effect emitter element can in particular differ, especially because of a different assigned electrical potential. This embodiment variant is particularly advantageous for facilitating the operation of different field effect emitter elements.

An embodiment variant provides for properties to be determined after the electron emission has begun. The properties can be determined during the electron emission or after the electron emission. This embodiment variant is advantageous for monitoring the operation of the electron emitter and for adjusting it if required.

An advantageous development of the previous embodiment variant provides for the determination of properties to include checking the first current path for a short circuit. Checking for the short circuit can be effected in particular via the measuring unit, or alternatively or additionally via the sensor unit. The short circuit can, for example, be detected as an irregularity in the emission surface and/or as a reduced or zeroed conductivity of the first current path. This embodiment variant advantageously allows for a short circuit to be detected in the first current path.

An advantageous development of the previous embodiment variant provides, in the event of the short circuit, for activation of the first current limiting unit to include reducing the emission voltage and emitting a short circuit signal. In particular, the emission voltage can be zeroed in this instance. The electron emitter can, for example, be deactivated via the short circuit signal.

An advantageous development of the previous embodiment variant provides, in the event of the short circuit, for activation of the first current limiting unit to include triggering a circuit breaker of the first current limiting unit to interrupt the first current path irreversibly. This embodiment variant is particularly advantageous for deactivating the segment with the short circuit via the triggered circuit breaker.

An advantageous development of the previous embodiment variant provides, after activation of the first current limiting unit, for electrons to be emitted from a second current path, subject to the emission voltage between the gate electrode and the emission surface, via the second field effect emitter element, wherein a second field effect emitter element is part of the second current path. Triggering the circuit breaker merely causes in particular an irreversible interruption of the first current path. Advantageously, other current paths, especially the second current path, remain functional.

The (non-transitory) computer program product can be a computer program or comprise a computer program. The computer program product has in particular the program code sections that map the steps of the method according to embodiments of the present invention. This enables the method to be executed in a defined and repeatable manner and for control to be exercised over the transfer of the method according to embodiments of the present invention. The computer program product is preferably configured in such a way that the processing unit can execute the steps of the method, according to embodiments of the present invention, via the computer program product. The program code sections can in particular be loaded in a memory of the processing unit and typically are executed via a processor in the processing unit with access to the memory. If the (non-transitory) computer program product, especially the program code sections, is executed in the processing unit, all embodiment variants of the described method according to the present invention can typically be performed. The computer program product is, for example, stored on a physical, computer-readable medium and/or digitally stored as a data packet in a computer network. The computer program product can represent the physical, non-transitory computer-readable medium and/or the data packet in the computer network. Thus, embodiments of the present invention can also run from the physical, computer-readable medium and/or the data packet in the computer network. The physical, computer-readable medium is usually directly connectable to the processing unit, for example, by inserting the physical, computer-readable medium into a DVD drive or a USB port, wherein the processing unit has read access in particular to the physical, computer-readable medium. The data packet can preferably be accessed from the computer network. The computer network can have the processing unit or be directly connected to the processing unit via a Wide-Area-Network (WAN) or (Wireless-) Local-Area-Network connection (WLAN or LAN). For example, the computer program product can be digitally stored on a cloud server at a storage location of the computer network, be transferred via the WAN over the internet and/or via the WLAN or LAN to the processing unit, in particular via a download link that is linked to the storage location of the computer program product.

Features, advantages or alternative embodiment variants mentioned in the description of the device are also applicable to the method and vice versa. In other words, claims for the method can be expanded with features of the device and vice versa. In particular, the device according to embodiments of the present invention can be used in the method.

BRIEF DESCRIPTION OF THE DRAWINGS

The present invention is described in more detail and explained below using the exemplary embodiments presented in the figures. In the following figure description, structures and units that essentially remain the same are labeled with the same reference sign as when the respective structure or unit first appears.

They Show.

DETAILED DESCRIPTION

Figure 1:
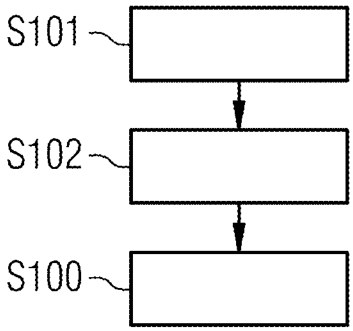
FIG. 1 a first variant of the method according to an embodiment of the present invention, FIG. 2 a second variant of the method according to an embodiment of the present invention, FIG. 3 a first exemplary embodiment of the first variant, FIG. 4 a second exemplary embodiment of the first variant, FIG. 5 a first exemplary embodiment of the second variant, FIG. 6 a second exemplary embodiment of the second variant, FIG. 7 an electron emitter according to an embodiment of the present invention, FIG. 8 a cathode device according to an embodiment of the present invention, and FIG. 9 an X-ray source.

FIG. 1 shows a first variant of a method, according to an embodiment of the present invention, for reducing an electron emission of an electron emitter in a flow chart with steps S100 to S102.

The electron emitter has

- a plurality of field effect emitter elements aligned in parallel to form an emission surface on the top of the plurality of field effect emitter elements aligned in parallel,
- a gate electrode, which is arranged above the emission surface, and
- a first current limiting unit,
- wherein the first current limiting unit and at least one first field effect emitter element of the plurality of field effect emitter elements are part of a first current path,
- wherein the at least one first field effect emitter element is arranged electrically between the first current limiting unit and the gate electrode in the first current path, It is characteristic of the first variant that the properties are determined in accordance with S101 before the electron emission.

Method step S101 characterizes a determination of a property of the first current path.

Method step S102 characterizes an activation of the first current limiting unit for reducing the electron emission of the electron emitter, subject to the determined properties of the first current path.

Method step S100 characterizes an emission of electrons from the first current path via the at least one first field effect emitter element, subject to an emission voltage between the gate electrode and the emission surface.

Figure 2:
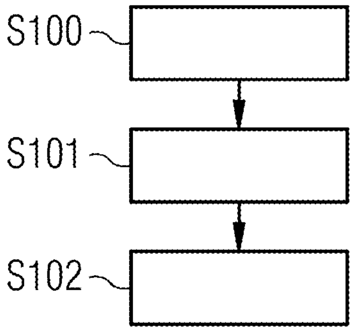

FIG. 2 shows a second variant of a method, according to an embodiment of the present invention, for reducing an electron emission of an electron emitter in a flow chart with steps S100 to S102.

It is characteristic of the second variant that the properties are determined in accordance with S101 after the electron emission has begun.

Figure 3:
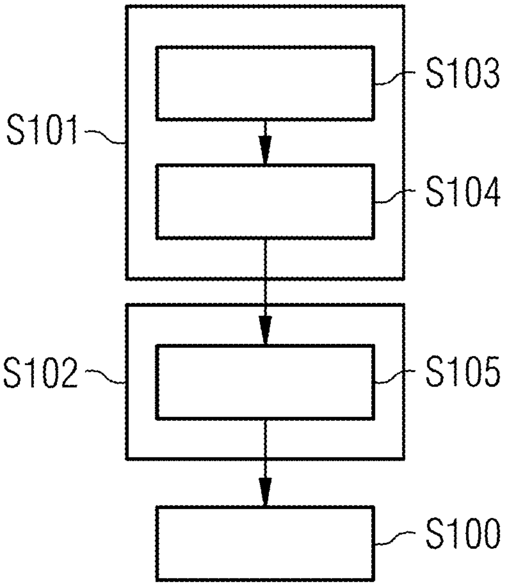

FIG. 3 shows a first exemplary embodiment of the first variant in a flow chart.

Method step S103 characterizes that the determination of properties includes determining the geometric form of the at least one first field effect emitter element in relation to the emission surface.

Method step S104 characterizes that the determination of properties includes assigning the electrical potential to the geometric form.

Method step S105 characterizes that the activation of the first current limiting unit includes applying the assigned electrical potential to a first potential-regulating electrode of the first current limiting unit for reducing the emission voltage in relation to the at least one first field effect emitter element.

Figure 4:
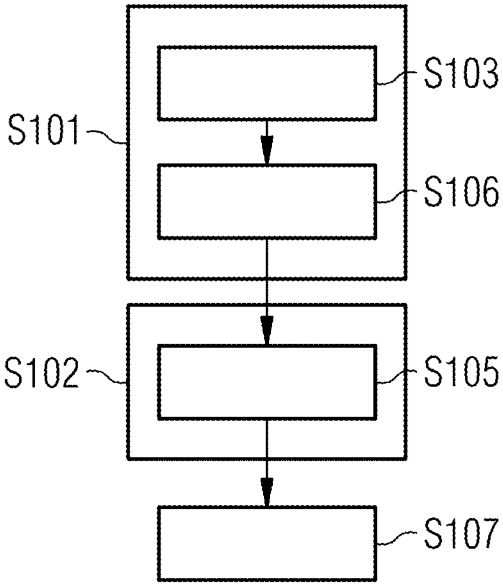

FIG. 4 shows a second exemplary embodiment of the first variant in a flow chart.

Method step S106 characterizes that the determination of properties includes assigning an electrical potential to the geometric form, wherein the assigned electrical potential corresponds to the gate potential for zeroing the emission voltage.

Method step S107 characterizes that, after activation of the first current limiting unit, electrons are emitted from a second current path, subject to the emission voltage between the gate electrode and the emission surface, via the second field effect emitter element, wherein a second field effect emitter element is part of the second current path, wherein during the electron emission a different emission voltage is applied in relation to the second field effect emitter element than in relation to the at least one first field effect emitter element.

Figure 5:
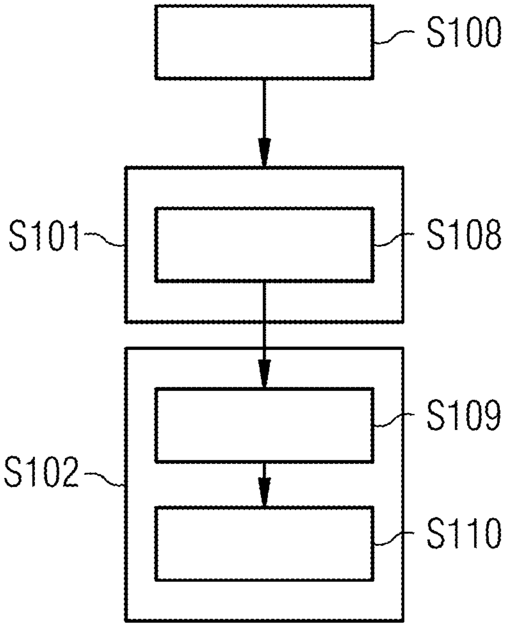

FIG. 5 shows a first exemplary embodiment of the second variant in a flow chart.

Method step S108 characterizes that the determination of properties includes checking the first current path for a short circuit.

Method step S109 characterizes that, in the event of the short circuit, activation of the first current limiting unit includes reducing the emission voltage.

Method step S110 characterizes that, in the event of the short circuit, activation of the first current limiting unit includes emitting a short circuit signal.

Figure 6:
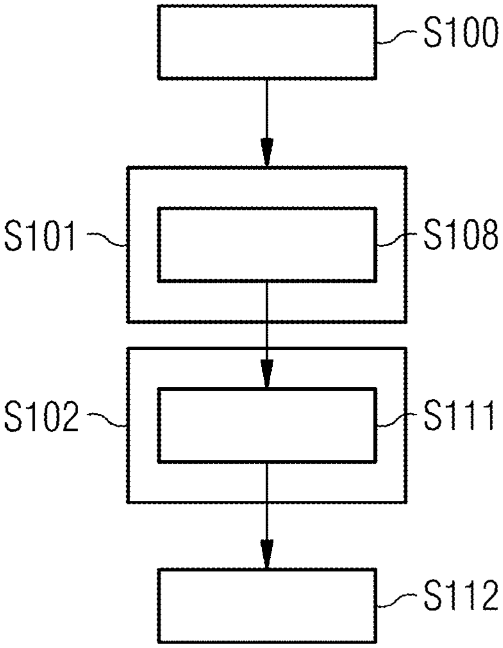

FIG. 6 shows a second exemplary embodiment of the second variant in a flow chart.

Method step S111 characterizes that, in the event of the short circuit, activation of the first current limiting unit includes triggering a circuit breaker of the first current limiting unit to interrupt the first current path irreversibly.

Method step S112 characterizes that, after activation of the first current limiting unit, electrons are emitted from a second current path, subject to an emission voltage between the gate electrode and the emission surface, via the second field effect emitter element, wherein a second field effect emitter element is part of the second current path.

Figure 7:
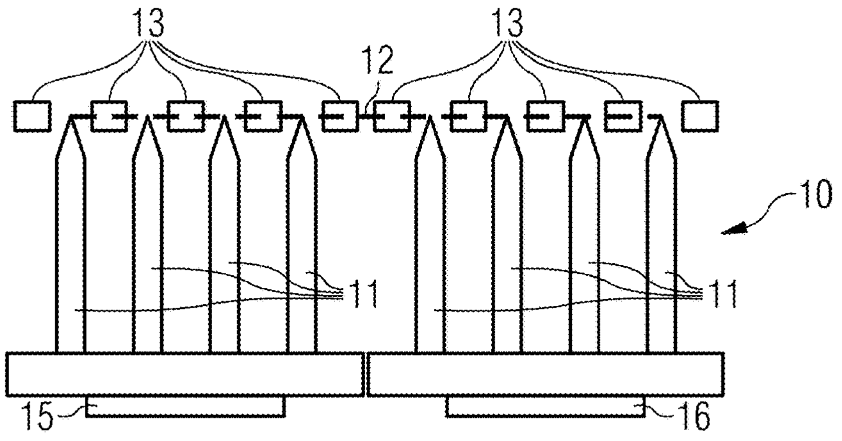

FIG. 7 shows an electron emitter 10, according to an embodiment of the present invention, in a schematic cross section.

The electron emitter 10 has a plurality of field effect emitter elements 11 aligned in parallel to form an emission surface 12 on the top of the plurality of field effect emitter elements 11 aligned in parallel. The field effect emitter elements 11 are arranged on an optional substrate. The emission surface 12 is perpendicular to the image plane of FIG. 7 and is marked by a dashed line.

The electron emitter 10 also has a gate electrode 13, which is arranged above the emission surface 12. The gate electrode 13 is embodied as a grid. The grid is arranged as close as possible to the ends of the field effect emitter elements 11.

A first current path in FIG. 7 comprises four field effect emitter elements 11, and a second current path comprises four additional field effect emitter elements 11. The electron emitter 10 in FIG. 7 is thus a so-called segmented or pixelated emitter. The electron emitter 10 also has a first current limiting unit 15 and a second current limiting unit 16.

The first current limiting unit 15 and at least one first field effect emitter element of the plurality of field effect emitter elements 11 are part of a first current path. The at least one first field effect emitter element is electrically arranged between the first current limiting unit 15 and the gate electrode in the first current path. The first current limiting unit 15 has a first potential-regulating electrode for reducing the emission voltage in relation to the at least one first field effect emitter element.

The second current limiting unit 16 and at least one additional field effect emitter element of the plurality of field effect emitter elements 11 are part of a second current path. The at least one second field effect emitter element is electrically arranged between the second current limiting unit 16 and the gate electrode in the second current path. The second current limiting unit 15 has a second potential-regulating electrode for reducing the emission voltage in relation to the at least one second field effect emitter element.

Alternatively or additionally, the first current limiting unit 15 can have a circuit breaker to interrupt the first current path irreversibly. It is conceivable that the second current limiting unit 16 alternatively or additionally has a circuit breaker to interrupt the second current path irreversibly. Circuit breakers can in particular be upstream of the field effect emitter elements or be designed as part of the field effect emitter elements.

Figure 8:
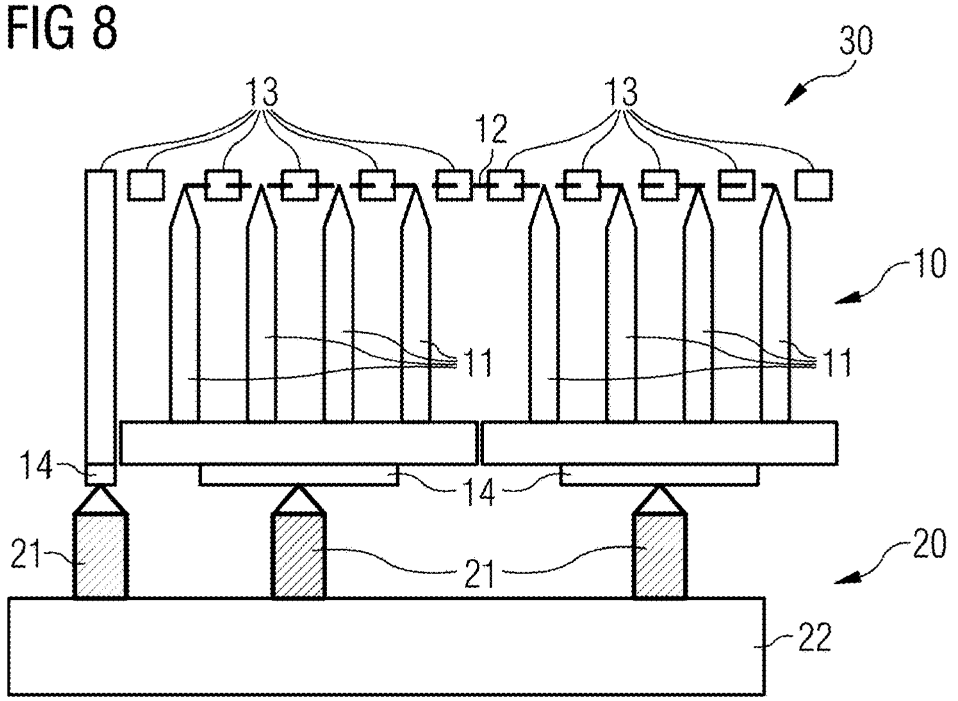

FIG. 8 shows a cathode device 30, according to an embodiment of the present invention, in a schematic cross section.

The cathode device 30 has the electron emitter 10 and an emitter seat 20. The first current limiting unit 15 and the second current limiting unit 16 are not shown in FIG. 8.

Additionally, the electron emitter 10 can have multiple first contact elements 14 for the at least two current paths of the electron emitter 10 carrying current independently of each other. The multiple first contact elements 14 are shown as fixed in FIG. 8.

The first current path and the second current path are each connectable via a separate first contact element 14 to a separate second contact element 21. The electron emitter 10 in FIG. 8 is thus a so-called segmented or pixelated emitter.

The emitter seat 20 has multiple second contact elements 21, which can be connected at the end of the current paths to the multiple first contact elements 14 and are electrically connected in FIG. 8. Subject to an emission voltage between the gate electrode 13 and the emission surface 12, especially also the electrical connection between the contact elements 14, 21, electrons can be emitted from at least one of the current paths via the field effect emitter elements 11.

The multiple first contact elements 14 are arranged on a side of the plurality of field effect emitter elements 12 aligned in parallel that is turned away from the emission surface 12. In the case of the cathode device 30 of FIG. 8, the multiple first contact elements 14 are only arranged on the side that is turned away, wherein the side turned away from the emission surface 12 is the bottom of the plurality of field effect emitter elements 11 aligned in parallel that is opposite the emission surface 12 and facing the emitter seat 20.

The first contact elements 14 are only arranged in a first plane. The multiple second contact elements 21 are only arranged in a second plane. The first plane and the second plane are aligned in parallel to each other. The multiple first contact elements 14 are advantageously arranged according to a ball grid array (BGA).

A contact surface of one of the multiple first contact elements 14 and a contact surface of one of the multiple second contact elements 21 have a different surface area. The multiple second contact elements 21 each have one contact point, so that its surface area is smaller than the surface area of the associated multiple first contact elements 14.

The emitter seat 20 has a carrier body 22. The multiple second contact elements 21 are designed to move relative to the carrier body 22 for the connection. Alternatively or additionally, the multiple first contact elements 14 can be designed to move relative to the field effect emitter elements 11.

A further current path of the at least two current paths carrying current independently of each other has the gate electrode 13 and one of the multiple second contact elements 21. This current path also has a further first contact element 14.

The mobile design is effected via an elastic connecting element, wherein the at least one elastic connecting element has a mechanical power transmission, which is a press pin or a spring bar. The multiple second contact elements 21 are only connected to the multiple first contact elements 14 via force fitting. A form-fit connection would be conceivable as an alternative or additional option.

Figure 9:
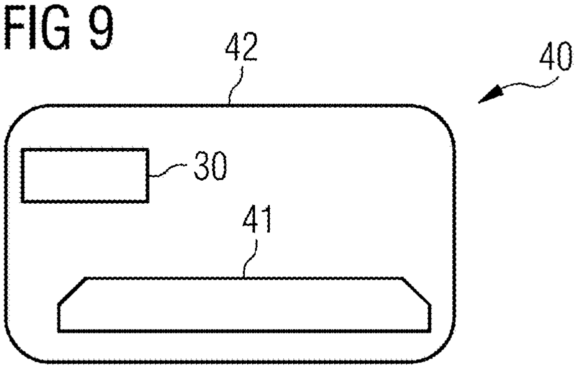

FIG. 9 shows an X-ray source 40 in a schematic longitudinal section.

The X-ray source 40 has a cathode device 30, an anode 41, and an evacuated housing 42. The cathode device 30 and the anode 41 are arranged within the evacuated housing 42.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as “processing” or “computing” or “calculating” or “determining” of “displaying” or the like, refer to the action and processes of a computer system, or similar electronic computing device/hardware, that manipulates and transforms data represented as physical, electronic quantities within the computer system’s registers and memories into other data similarly represented as physical quantities within the computer system memories or registers or other such information storage, transmission or display devices.

In this application, including the definitions below, the term ‘module’ or the term ‘controller’ may be replaced with the term ‘circuit.’ The term ‘module’ may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been illustrated and described in more detail by preferred exemplary embodiments, this shall not limit the present invention to the disclosed examples, and other variations may be deduced from these by the person skilled in the art without extending beyond the scope of protection of the present invention.

What is claimed is:

1. A method for reducing electron emission of an electron emitter, wherein the electron emitter includes a plurality of field effect emitter elements, a gate electrode and a first current limiting unit, wherein the plurality of field effect emitter elements are aligned in parallel to form an emission surface on a top of the plurality of field effect emitter elements, wherein the gate electrode is arranged above the emission surface, wherein the first current limiting unit and at least one first field effect emitter element of the plurality of field effect emitter elements are part of a first current path, wherein the at least one first field effect emitter element is electrically connected between the first current limiting unit and the gate electrode in the first current path, and wherein the method comprises:

emitting electrons from the first current path via the at least one first field effect emitter element, subject to a first emission voltage between the gate electrode and the emission surface;

determining properties of the first current path; and activating the first current limiting unit subject to the properties of the first current path, to reduce the electron emission of the electron emitter.

2. The method as claimed in claim 1, wherein the properties are determined before the electron emission.

3. The method as claimed in claim 2, wherein the determining properties comprises:

determining a geometric form of the at least one first field effect emitter element relative to the emission surface; and assigning an electrical potential to the geometric form.

4. The method as claimed in claim 3, wherein the activating the first current limiting unit comprises:

applying the electrical potential to a first potential-regulating electrode of the first current limiting unit to reduce the first emission voltage relative to the at least one first field effect emitter element.

5. The method as claimed in claim 4, wherein the electrical potential corresponds to a gate potential for zeroing the first emission voltage.

6. The method as claimed in claim 3, wherein, after activating the first current limiting unit, the method comprises:

emitting electrons from a second current path via a second field effect emitter element, subject to a second emission voltage between the gate electrode and the emission surface, wherein the second field effect emitter element is part of the second current path.

7. The method as claimed in claim 6, wherein during electron emission, the first emission voltage is different from the second emission voltage.

8. The method as claimed in claim 1, wherein the properties are determined after electron emission has started.

9. The method as claimed in claim 8, wherein the determining properties comprises:

checking the first current path for a short circuit.

10. The method as claimed in claim 9, wherein, in the event of the short circuit, activating the first current limiting unit comprises:

reducing the first emission voltage; and emitting a short circuit signal.

11. The method as claimed in claim 9, wherein, in the event of the short circuit, the activating the first current limiting unit comprises:

triggering a circuit breaker of the first current limiting unit to interrupt the first current path irreversibly.

12. The method as claimed in claim 11, wherein, after activation of the first current limiting unit, the method comprises:

emitting electrons from a second current path via a second field effect emitter element, subject to a second emission voltage between the gate electrode and the emission surface, wherein the second field effect emitter element is part of the second current path.

13. An electron emitter configured to perform a method as claimed in claim 1.

14. An X-ray source, comprising:

a cathode device having an emitter seat and an electron emitter as claimed in claim 13;

an anode; and an evacuated housing; wherein the electron emitter, the emitter seat, and the anode are arranged within the evacuated housing.

15. A non-transitory computer-readable storage medium storing computer-executable instructions that, when executed at a processing unit of an electron emitter, cause the electron emitter to perform a method as claimed in claim 1.

16. The method as claimed in claim 4, wherein, after activating the first current limiting unit, the method comprises:

emitting electrons from a second current path via a second field effect emitter element, subject to a second emission voltage between the gate electrode and the emission surface, wherein the second field effect emitter element is part of the second current path.

17. The method as claimed in claim 10, wherein, in the event of the short circuit, the activating the first current limiting unit comprises:

triggering a circuit breaker of the first current limiting unit to interrupt the first current path irreversibly.

* * * * *